US011847406B1

(12) United States Patent
Mallya Kasaragod et al.

(10) Patent No.: US 11,847,406 B1
(45) Date of Patent: Dec. 19, 2023

(54) NATURAL LANGUAGE PROCESSING ON SEMI-STRUCTURED DATA

(71) Applicant: Amazon Technologies, Inc., Seattle, WA (US)

(72) Inventors: Sunil Mallya Kasaragod, San Francisco, CA (US); Yahor Pushkin, Redmond, WA (US); Saman Zarandioon, Seattle, WA (US); Graham Vintcent Horwood, Centreville, VA (US); Miguel Ballesteros Martinez, New York, NY (US); Yogarshi Paritosh Vyas, New York, NY (US); Yinxiao Zhang, Issaquah, WA (US); Diego Marcheggiani, Barcelona (ES); Yaser Al-Onaizan, Cortlandt Manor, NY (US); Xuan Zhu, Bellevue, WA (US); Liutong Zhou, Jersey City, NJ (US); Yusheng Xie, Mountain View, CA (US); Aruni Roy Chowdhury, Seattle, WA (US); Bo Pang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 17/217,807

(22) Filed: Mar. 30, 2021

(51) Int. Cl.

| | |
|---|---|
| ***G06F 17/00*** | (2019.01) |
| ***G06F 40/143*** | (2020.01) |
| ***G06F 40/169*** | (2020.01) |
| ***G06N 20/00*** | (2019.01) |
| ***G06F 40/154*** | (2020.01) |
| ***G06F 40/103*** | (2020.01) |
| ***G06F 40/284*** | (2020.01) |

(52) U.S. Cl.
CPC .......... *G06F 40/143* (2020.01); *G06F 40/103* (2020.01); *G06F 40/154* (2020.01); *G06F 40/169* (2020.01); *G06F 40/284* (2020.01); *G06N 20/00* (2019.01)

(58) Field of Classification Search
CPC .... G06F 40/143; G06F 40/103; G06F 40/284; G06F 40/169; G06F 40/154; G06N 20/00
See application file for complete search history.

(56) References Cited

U.S. PATENT DOCUMENTS

| | | | | |
|---|---|---|---|---|
| 9,236,043 | B2 * | 1/2016 | Kurzweil | G10L 13/00 |
| 11,587,347 | B2 * | 2/2023 | Carrier | G06F 3/0482 |
| 2009/0092317 | A1 * | 4/2009 | Nagarajan | G06V 30/1448 382/173 |
| 2015/0161086 | A1 * | 6/2015 | Wu | G06F 40/30 715/234 |

(Continued)

*Primary Examiner* — Mohammed H Zuberi
(74) *Attorney, Agent, or Firm* — NICHOLSON DE VOS WEBSTER & ELLIOTT, LLP

(57) ABSTRACT

Techniques for performing natural language processing (NLP) on semi-structured data are described. An exemplary method includes receiving a semi-structured document to perform NLP on using a trained NLP model; converting the semi-structured document into a secondary format, wherein the secondary format includes spatial information for tokens of the semi-structured document; flattening the converted, secondary formatted semi-structured document into a Unicode Transformation Format text file; performing NLP on the Unicode Transformation Format text file using the trained NLP model; and providing a result of the NLP to a requester.

20 Claims, 11 Drawing Sheets

(56) References Cited

U.S. PATENT DOCUMENTS

| | | | | |
|---|---|---|---|---|
| 2016/0048655 | A1* | 2/2016 | Maitra | G16H 70/40 705/3 |
| 2018/0341830 | A1* | 11/2018 | Jagan | G06V 30/413 |
| 2020/0210490 | A1* | 7/2020 | Hutchins | G06F 40/30 |
| 2021/0248153 | A1* | 8/2021 | Sirangimoorthy | G06F 16/316 |

* cited by examiner

Contract Billing

| Invoice Number | Invoice Date |
| --- | --- |
| 16232-0001 | 2019-08-07 |

Ship To

| Account Number | 10066042 | |
| --- | --- | --- |
| Name | First | Alice |
| | Last | Xeu |

SEATTLE CENTER
55X BROADWAY
SEATTLE WA 98121-3132

Sold To

| Account Number | 10066041 | |
| --- | --- | --- |
| Name | First | Bob |
| | Last | Zue |

STANFORD CENTER
12X BROADWAY
REDWOOD CITY CA 94063-3132

— 301
inside amazon

```
{
  "CLIENTREQUESTTOKEN": "STRING",
  "DATAACCESSROLEARN": "STRING",
  "INPUTDATACONFIG": {
    "ANNOTATIONS": {
      "S3URI": "STRING"
    },
    "AUGMENTEDMANIFESTS": [
      {
        "ATTRIBUTENAMES": [ "STRING" ],
        "S3URI": "STRING"
        “TYPE”:”STRING”
        “ANNOTATIONDATAS3URI”: “STRING”
      }
    ],
    "DATAFORMAT": "STRING",
    "DOCUMENTS": {
      "S3URI": "STRING"
    },
    "ENTITYLIST": {
      "S3URI": "STRING"
    },
    "ENTITYTYPES": [
      {
        "TYPE": "STRING"
      }
    ]
  },
  "LANGUAGECODE": "STRING",
  "RECOGNIZERNAME": "STRING",
  "TAGS": [
    {
      "KEY": "STRING",
      "VALUE": "STRING"
    }
  ],
  "VOLUMEKMSKEYID": "STRING",
  "VPCCONFIG": {
    "SECURITYGROUPIDS": [ "STRING" ],
    "SUBNETS": [ "STRING" ]
  }
}
```

FIG. 6

```
{
"Version": "String",
"DocumentType": "String",
"DocumentMetadata": {
        "Pages": [
                {
                        "PageNumber": Number,
                        "Dimension": {
                                "Width": Number,
                                "Height": Number
                        }
                }
        ]
},

"TextBlobs": [
        {
                "Type": "String",
                "Text": "String",
                "PageNumber": Number,
                "Geometry": {
                        "BoundingBox": {
                                "Width": Number,
                                "Height": Number,
                                "Left": Number,
                                "Top": Number
                        }
                },

                "ChildTextBlobIndices": List<Number>
        },
        ...
],
"Entities": [
{
"TextBlobReferences": [
      {
            "LineTextBlobIndex": List<Number>,
            "WordTextBlobIndices": List<Number>,
            "BeginOffset": Number,
            "EndOffset": Number
      },
      ...
],

"Text": "String",
"Type": "String",
},
...
]
}
```

FIG. 7

NATURAL LANGUAGE PROCESSING ON SEMI-STRUCTURED DATA

BACKGROUND

Natural Language Processing models are normally developed based on the grammar of natural languages. However, in practice documents often have a structure which holds the text. Such structures often carry important information that needs to be taken into account to properly process the contained text. In our solution, we extend the grammar of natural languages by integrating them with a Context Free Grammar that is expressive enough to encode the common relevant structures of documents, such as tables, sections, paragraphs, bullet points, headers, and footers. Given the fact that the complexity of the new grammar is not higher than that of the natural languages, the existing model have the capacity to learn the new language and handle the downstream tasks without making any change in the structure of the model.

BRIEF DESCRIPTION OF DRAWINGS

Various embodiments in accordance with the present disclosure will be described with reference to the drawings, in which:

FIG. 3 illustrates an exemplary document that NLP is to be performed on.

FIG. 6 illustrates an embodiment of a training request for an entity recognizer.

FIG. 7 illustrates embodiments of a schema to be used for annotations.

DETAILED DESCRIPTION

The present disclosure relates to methods, apparatus, systems, and non-transitory computer-readable storage media for natural language processing (NLP). Currently, some NLP services only accept plain-text data as input. However, many user deal with semi-structured data stored in formats such as Microsoft Word (Doc, Docx), PPT, HTML, Markdown, image (PNG or JPEG), PDF, etc. A naive conversion of data in such documents to plain text may strip away vital information from the document and may also lead to interleaved text that introduces significant noise which negatively impacts a trained model's performance.

Embodiments detailed herein utilize a canonical format to describe semi-structured documents. The canonical format that maintains at least signals from an input document that are important to the semantics of the contained data and the task. The canonical format, in some embodiments, takes away other formatting information that is mainly for visual appearance (for example, font size, color, pictures, etc.). The canonical format captures the document's hierarchical, recursive structure and maintains the context of the text of the document. The information that the structure of a document carries is captured and expressed by a context-free grammar. The terminal of this grammar is plain-text that expresses information using a natural language grammar.

In some embodiments, a Backus-Naur form or Backus normal form (BNF)-based grammar is utilized to capture required information from the structure of a document. In other embodiments, a different style grammar is used. A BNF grammar is set of derivation rules having a <symbol> and an expression which consists of one or more sequences of symbols. The "::=" means that the symbol on the left is to be replaced by the expression on the right. Below are exemplary rules for some embodiments of a BNF-based grammar to be used in a canonical format for semi-structured documents.

Figure 1:
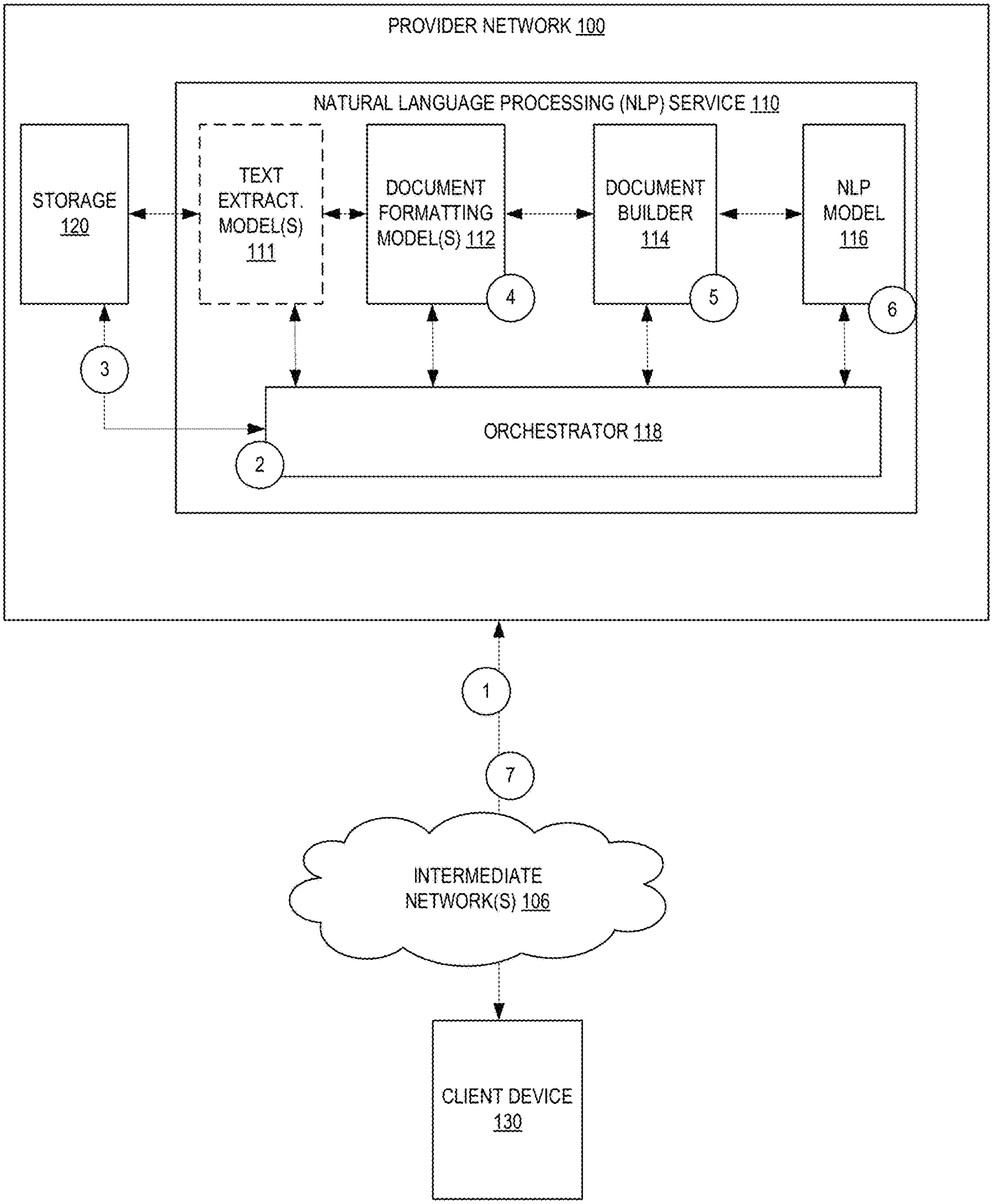
FIG. 1 illustrates aspects of nature language processing (NLP) service of a provider network.

<doc>::=DOC_START<doc content> DOC_END
<doc content>::=<pages>|blocks
<pages>::= <pages>
::=PAGE_START <blocks> <PAGE_END>
<blocks>::=<block> <blocks>|" "
<block>::=BLOCK_START <segments> BLOCK_END|<segment>
<segments>::=<segment> <segments>|" "
<segment>::=<word list>|<line>|<key value pair>|<table>
<word list>::=<word> <word list>|" "
<word>::=<unicode sequence>
<unicode sequence>::=UNICODE <unicode sequence>|" "
<line>::=<word list> NEW_LINE
<table>::=TABLE_START <rows> TABLE_END
<rows>::=<row> <rows>|" "
<row>::=ROW_START <cells> ROW_END
<cells>::=<cells> <cell>|" "
<cell>::=COLUMN_START <blocks> COLUMN_END
<key value pair>::=TABLE_START ROW_START <column> <column> ROW_END TABLE_END FIG. 1 illustrates aspects of nature language processing (NLP) service of a provider network. The NLP service 110 responds to a request for performing NLP on documents. Examples of NLP operations that may be performed may include, but are not limited to: detecting a dominant language, detecting entities, detecting key phrases, detecting personally identifiable information (PII), detecting sentiment, detecting syntax, detecting events, topic modeling, etc. The NLP operations may be performed on a single document, multiple documents, or done as a batch.

The NLP service 110 may include several aspects and an exemplary version is shown. In some embodiments, an orchestrator 118 is responsible for at least coordinating various models to perform NLP processing using at least the NLP model 116 according to a request. In some embodiments, the orchestrator 118 is also used to invoking training on one or more of the models. In some embodiments, the orchestrator 118 allows for a user to annotate documents (e.g., HTML versions of documents). These annotated documents may be used to generate training data.

In some embodiments, the NLP service 110 includes one or more text extraction models 111. A text extraction model 111 may extracts printed text, handwriting, etc. from documents which may include images (such as individual images in a document such as images in a word processing document, a single image file (such as a TIFF image), a file comprising a collection of images (such as a portable document format document), etc.

One or more document formatting models 112 take in a document (and/or extracted text) and generate a canonical formatted representation of the document. Details of an exemplary canonical format are detailed above. The one or more document formatting models 112 may be trained using domain-specific knowledge.

The canonical formatted representation of the document is converted into one or more document formats by a document builder 114. For example, one or more of an HTML version, Pickle version, a (serialized) JSON version, and a flattened UTF-8 version are built in some embodiments. HTML versions may be annotated and used, along with a flattened UTF-8 version, to train the NLP model 116. The documents themselves, canonical formatted representations thereof, and/or documents built from the canonical formatted representations may be stored in storage 120.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute resources (e.g., a "compute instance" such as a VM using a guest operating system (0/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Figure 2:
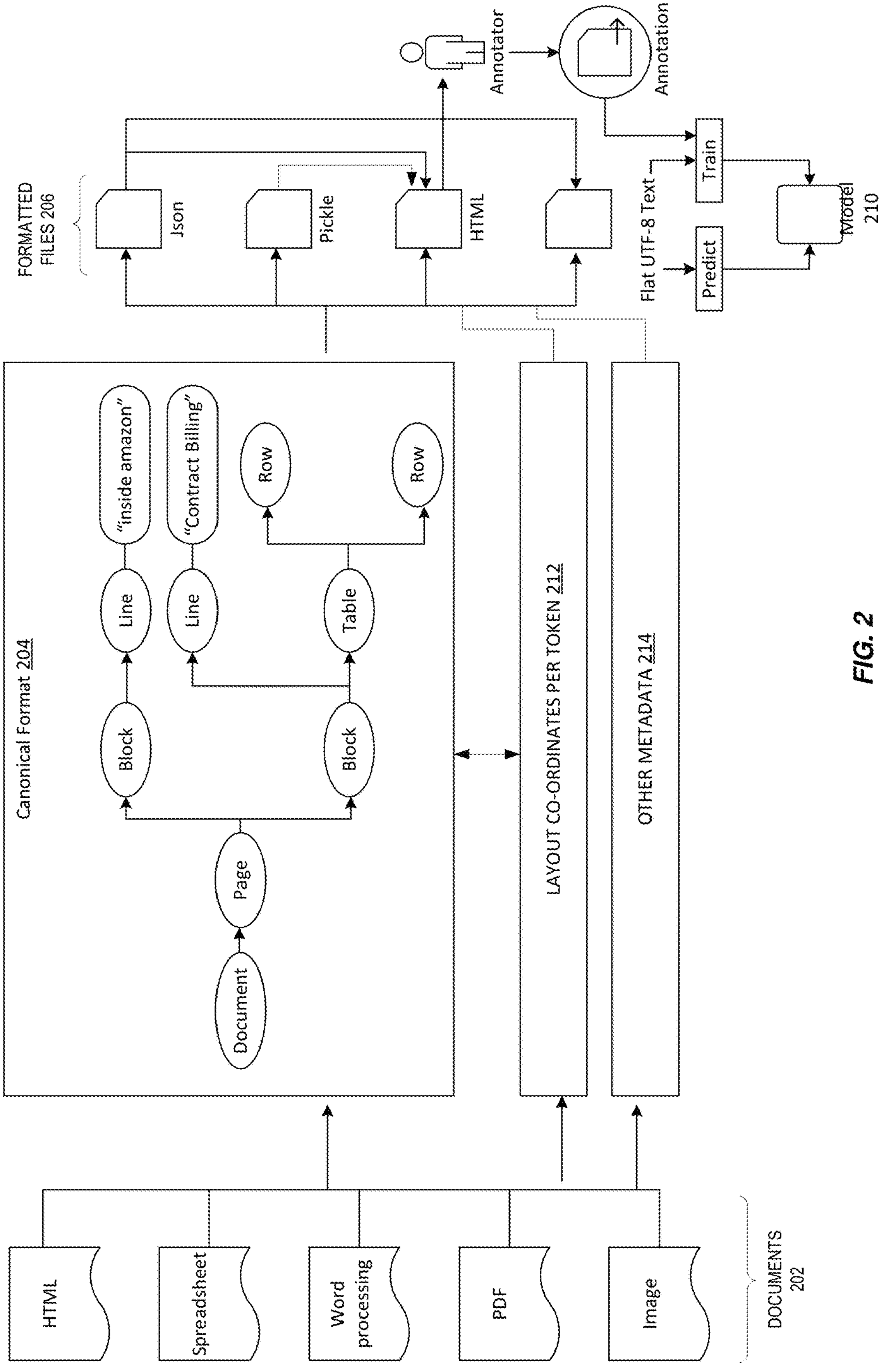
FIG. 2 illustrates embodiments of using a format for prediction and/or training.

FIG. 2 illustrates embodiments of using a format for prediction and/or training. As shown, one or more documents 202 are to converted into a canonical format 204 in some embodiments. In this example, the document that was converted into canonical format 204 included a page having a plurality of blocks, the blocks having one or more lines, etc. In some embodiments, the document formatting model(s) 112 perform this conversion.

In some embodiments, positional (layout) coordinates 212 are generated per token in the canonical format 204 or for the file itself (e.g., for a PDF file). In some embodiments, layout coordinates 212 are generated per token without the use of the canonical format 204. The layout coordinates 212 provide spatial positional information (e.g., where a given word/token appears in a (x,y) position in an image, document, etc.).

In some embodiments, formatting metadata 204 (not necessarily in canonical format) (such as <table-start></table-end> is generated.

In some embodiments, the canonical formatted version of the document is then further formatted into one or more different file types 206 such as JSON, Pickle, serialized HTML, and/or a serialized flat UTF-8 text including the positional coordinates. In some embodiments, an HTML type document is generated from a JSON or Pickle file. Similarly, a JSON formatted document (which is in the form of UTF-8) can be flatted into a flattened UFT-8 file. Note other formats such as XML, etc. could be used. The flattened UFT-8 file is used during inference (prediction) using model 210 or during training of the model 210. Note that when a canonical format is not used, the positional coordinates of the tokens still are a part of a formatted version. In some embodiments, the formatting metadata 204 is also included.

To feed the data to the model, in some embodiments, the data is flattened into UTF-8 text. In some embodiments, this is done by serializing the data in canonical format by replacing the nodes with rare UTF-8 symbols (see table below). The process of serializing the canonical format to HTML or the UTF-8 text is the same except the symbol that is chosen to represent the corresponding node:

| HTML Tag | UTF-8 Character | Unicode |
|---|---|---|
| <html></html> | '' (remove) | |
| <body></body> | '' (remove) | |
| <p> | ╭ | 0x256d |
| </p> | ╮ | 0x256e |
| <br> | ┋ | 0x250b |
| <table> | ╔ | 0x2554 |
| </table> | ╝ | 0x255d |
| <tr> | ╠ | 0x2560 |
| </tr> | ╣ | 0x2563 |
| <td> | ┌ | 0x250c |
| </td> | ┘ | 0x2518 |

In some embodiments, one or more of the formatted versions 206 are annotatable. Annotation allows for a user (annotator) to generate more specific training data to be used to train model 210. In some embodiments, a serialized HTML version is likely the easiest for a user (annotator) to annotate. Regardless of which file is annotated, the annotations (if any) and flat UFT-8 version are used in the training process. The model 210 can be trained using un-labeled and labeled data from a diverse set of document types.

In some embodiments, the model 210 is a transformer-based model. In some embodiments, model 210 is trained to handle semi-structured information by incorporating positional information in a 2D spatial space. In other words, the positional encoding is augmented from a single coordinate to two or more coordinates and learn where the token lies in the space along with the contextual information (e.g., (0,0) . . . (0.99,0.99)).

In some embodiments, the spatial information is encoded using absolute 2-d positional embeddings for each token. The first of these, x-embeddings, represents positional information along the x (or horizontal) axis. The second set of embeddings are y-embeddings that represent positional information along the y (or vertical) axis. Both x and y embeddings can be initialized either from a pre-trained model (e.g., BERT, SMITH, etc.) or randomly. Regardless of how they are initialized, they are updated along with the rest of the model when fine-tuning on task specific data such as what the annotations provide.

In some embodiments, the spatial information is encoded using relative 2-d positional embeddings for each token. Hole absolute positions enrich the model, using just these absolute positions may be suboptimal since the model 210 is forced also to implicitly reason about the relative distances between tokens. These relative position embeddings are integrated into a transformer network in two locations (a) into the self-attention computation for calculating the attention scores, and (b) summed with the token embeddings.

To account for two dimensions, the model 210, in some embodiments, uses relative positional embeddings that capture Euclidean distance and/or axis-specific relative positional embeddings. In an axis-specific relative approach the relative distance between tokens is calculated, separately for each (x and y) axis. Directions (above/below and left/right) are distinguished using the sign of the distance. The axis-specific distances are encoded with two separate embeddings and are integrated in the self-attention layers.

The conversion of documents to a universal canonical format, like the one proposed above, allows for the support of a new document type as simply being a matter of writing a logic to convert the new form to the canonical format (or training a model to do so). The annotation process and the output format remains consistent regardless of what the document format is.

Figure 3:
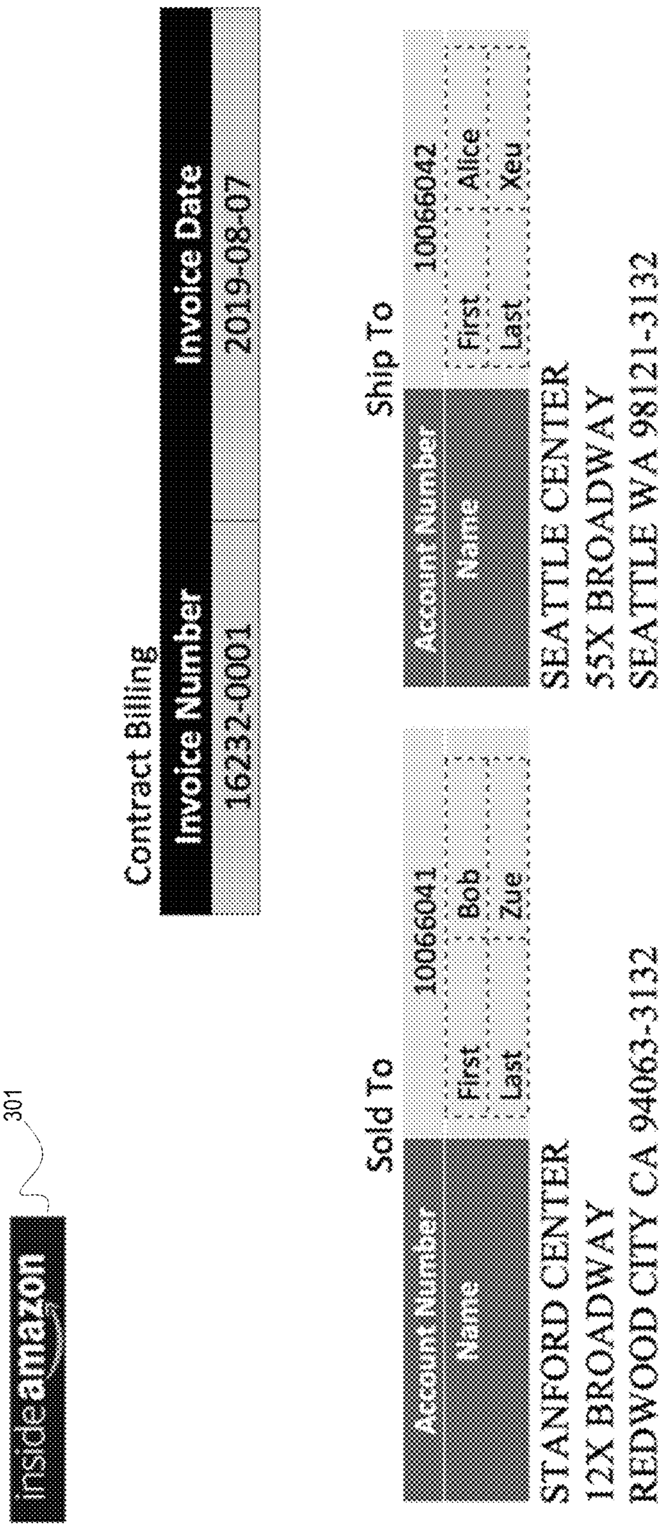

FIG. 3 illustrates an exemplary document that NLP is to be performed on. This particular document was in the form of a word processing document that included an image 301, multiple tables, and other lines.

The text of this document may be extracted and flattened as follows:

1 of 1
inside amazon
Contract Billing
Invoice Number
Invoice Date
16232-0001
2019-08-07
Sold To
Ship To
Account Number
10066041
Account Number
10066042
Name
First
Bob
Name
First
Alice
Last
Zue
Last
Xeu
STANFORD CENTER
SEATTLE CENTER
12X BROADWAY
55X BROADWAY
REDWOOD CITY CA 94063-3132
SEATTLE WA 98121-3132

Figure 4:
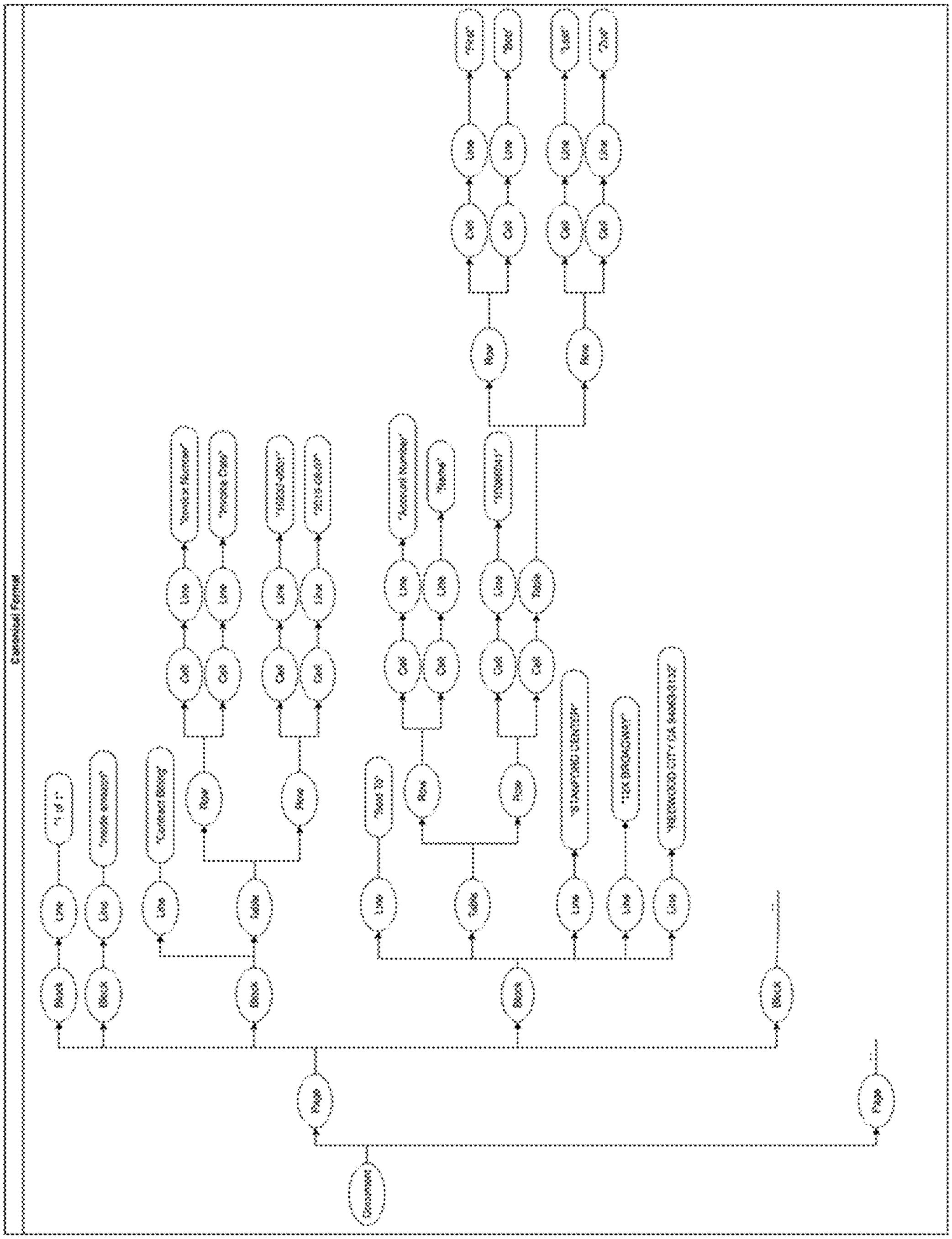
FIG. 4 illustrates an example of a canonical formatted version of the document of FIG. 3.

Note that this flattened text (which may be generated by text extraction model(s) 111) does not provide much in the way of relationships. FIG. 4 illustrates an example of a canonical formatted version of the document of FIG. 3. As shown, this format provides relationships to the extracted and flattened text. As such, one can see where a table started, how many rows in the table, the content of the rows, etc.

Figure 5:
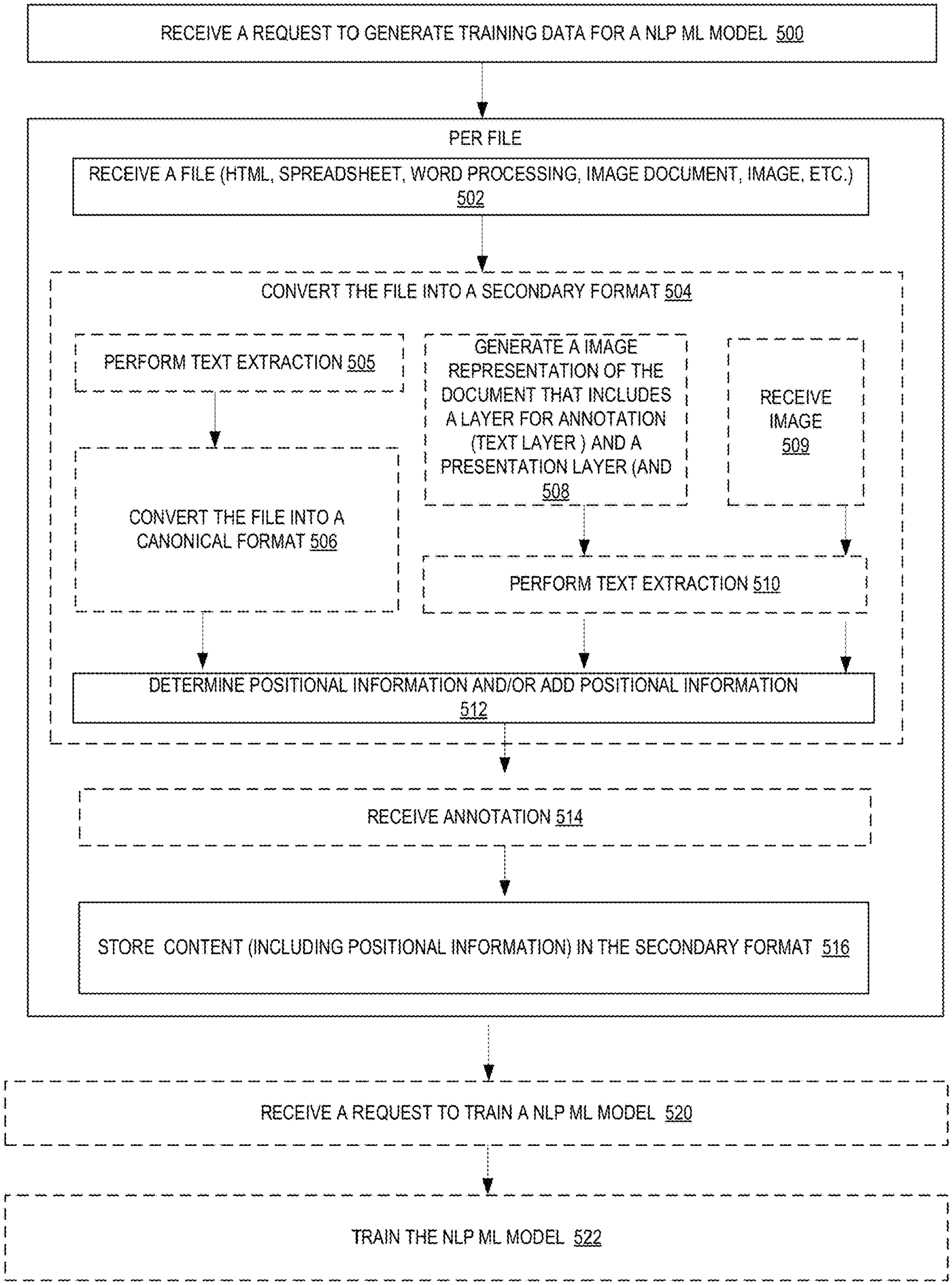
FIG. 5 is a flow diagram illustrating operations of a method for training a NLP model using, at least in part, training data generated from semi-structured documents according to some embodiments.

FIG. 5 is a flow diagram illustrating operations of a method for training a NLP model using, at least in part, training data generated from semi-structured documents according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the NLP service 110 of the other figures.

At 500 a request to generate training data for an NLP ML model is received. The request may include one or more of: a location of documents to be used to generate the training data, documents to be used to generate the training data, an indication of the type of documents to be used, an indication of what users are allowed to annotate the documents (and data thereof), a format of the training data (e.g., a column separated value, augmented manifest (for example, a labeled data set where the file is in JSON lines format and each line is a complete JSON object that contains a training document and its associated labels), an indication of the delimiter to use to separate labels, etc. Note the file(s) include(s) semi-structured data.

At 502 training data is generated. This generation may include several actions per file. At 502, a file (HTML, spreadsheet, word processing, image document, image, etc.) is received. Note the file could be retrieved from a storage location or provided as a part of the request to generate training data.

At 504, the received file is converted into a secondary format. This secondary format may be as simple as adding positional information for tokens. Text of the received file is extracted at 505 in some embodiments. For example, text is found in images, extracted from fields, tables, lines, etc. In some embodiments, this is performed by a text extraction model 111 such as Textract or a PDF parser library.

Depending on the implementation, how the file is handled differs. In some embodiments, the received file (after text extraction) is converted into a canonical format at 506. In some embodiments, this is performed by a document formatting model 112. In other embodiments, an image representation (such as a PDF file) of the file is generated at 508 and text extraction is performed at 510 (e.g., using a PDF parser library). This image representation includes at least one layer for annotation (e.g., a text layer) and a presentation layer (the image itself). In other embodiments, an image itself received on at 509 and text extraction is performed at 510.

At 512, positional information is determined and, in some embodiments, added to the canonical format, the image representation, or image itself as metadata. In particular, in some embodiments, line and word text blocks are given spatial information. Note that an entity that is represented by not only the entity text and its assigned label, but also the references to the word text blocks that matches the entity text. In some embodiments, text is linearized in human reading order. Note that in some embodiments, one or more formatted files are built using the canonical format, image representation, or image itself. In particular, in some embodiments, those formats with positional information are formatted. For example, a JSON file, Pickle file, serialized HTML file, and/or a flatten UTF-8 text file are built.

In some embodiments, annotation for one or more of the formatted files is received at 514. For example, labels may be received. Received annotations are stored in the formatted file at 516 or in a text layer at 518. FIG. 7 illustrates an embodiment of a schema for receiving comments.

At 520 a request to train an NLP ML model is received. The request may include, for example, one or more of: an identifier of the request, a resource name, a name of the NLP ML model, an indication of a format and location of the training data, an indication of the language of the training data, an indication of a mode of the NLP training (such as multi-class (e.g., identify a class per document) or multi-label (e.g., identify one or more labels per document)), an output configuration, tags to be associated with the NLP model where a tag is a key-value pair, an encryption key or key ID, etc. FIG. 6 illustrates an embodiment of a training request for an entity recognizer. In particular, an entity detector model is trained to inspect text for named entities and return information about them. In this example, the request either includes string of text to evaluate or a location of a file containing text. This request also includes, in some embodiments, an indication of an AnnotationDataS3Uri which is database prefix to the annotation files that are referred in augmented manifest file and/or a type of and augmented manifest (e.g., PlainTextDocument, SemiStructuredDocument wherein the default is PlainTextDocument if not specified). Note that in some embodiments, a single request may be used to generate training data and train an NLP model.

The NLP ML model is trained using the flattened formatted documents and annotation(s) if received, the image representation with annotations, etc. at 522 according to the request.

FIG. 7 illustrates embodiments of a schema to be used for annotations. One or more of the following fields are included. A version field allows a user to provide a version of the schema and/or document. A DocumentType field identifies the file format. It is used by application to know how to handle the corresponding data. A TextBlobs field lists TextBlob objects, which captures the extracted text information for the given document. A use case for this field is to capture a collection of Text and its metadata information that is successfully extracted from the document. For example, a word is considered as a TextBlob, also a line of text is also considered as a TextBlob. The structure of TextBlob is also hierarchical, meaning a TextBlob of Line is composed by A list TextBlob of Word. In some embodiments, "paragraph" information is included which is composed by a list TextBlob of Line, etc. An Entities field lists entity objects which capture the extracted entity information.

The TextBlob's structure may include several components such as a TextBlob.type field (a string having values like LINE or WORD); a TextBlob.Text field (containing the plain text that is extracted from the given document. When the Type comes to LINES, the new line character is used to distinguish the lines. This field is a useful information for customer to consume, such as trace the detected entity back to its original plain text, etc.); a TextBlob.PageNumber field (representing a page from which the TextBlob.Text comes from); a TextBlob.Geometry field; and/or a TextBlob.ChildTextBlobIndices field.

The Entity Structure may include several components such as an Entity.TextBlobReferences field (list of TextBlobReference structures); Entity.BeginOffset (start offset of Entity.Text); Entity.EndOffset (end offset of Entity.Text);

Entity.Text (text labeled as a certain entity type); Entity.Type (type of entity for text); and/or Entity.Score (confidence value).

The TextBlobReference may include several components such as a TextBlobReference.LineTextBlobIndex (index to top level of TextBlobs list representing a line); TextBlobReference.WordTextBlobIndex (index to top level of TextBlobs list representing a word); TextBlobReference.BeginOffset (begin offset of the entity text relative to the line TextBlob Text; and/or TextBlobReference.EndOffset (end offset of the entity text relative to the line TextBlob Text.

Figure 8:
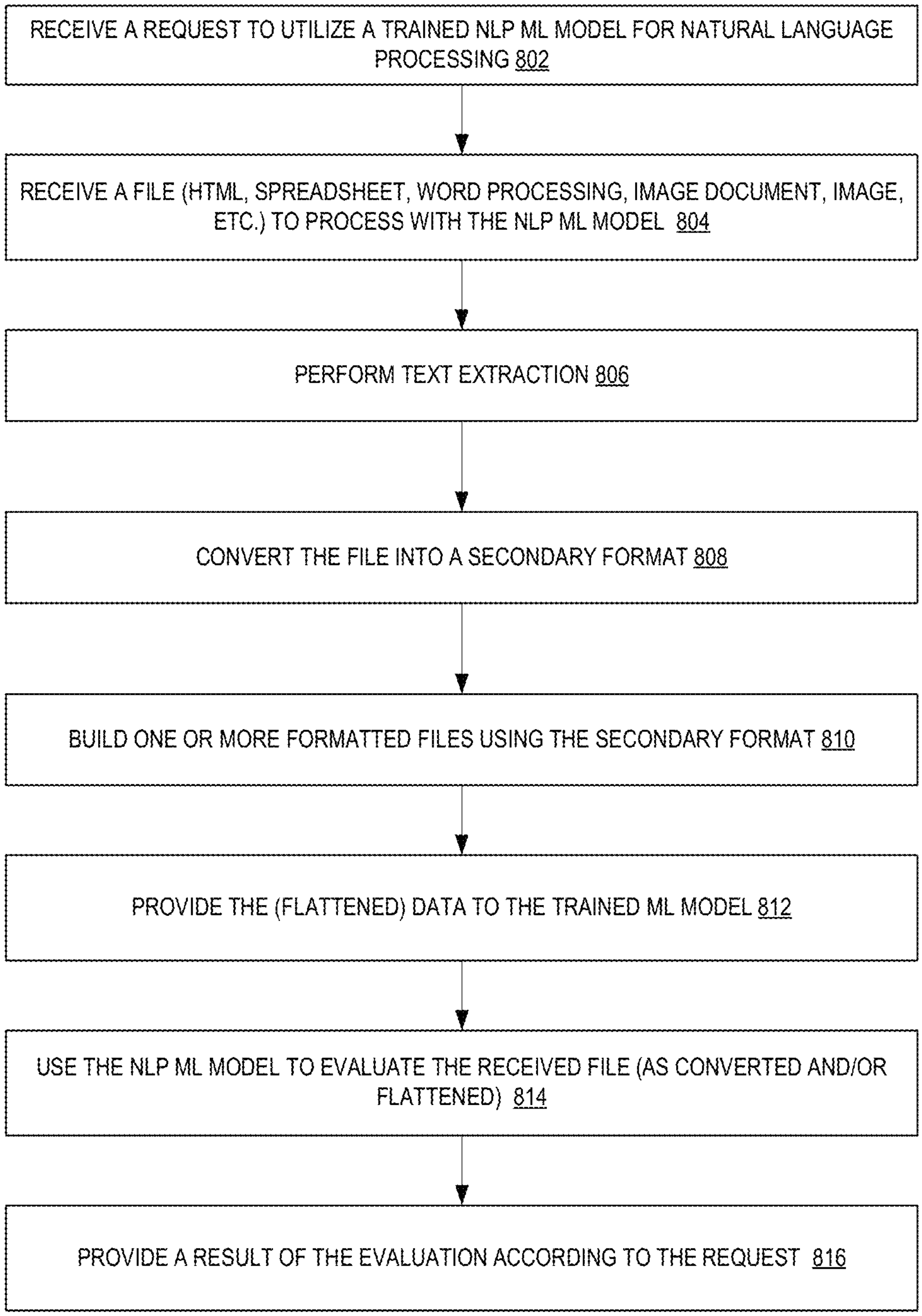
FIG. 8 is a flow diagram illustrating operations of a method for utilizing an NLP service to evaluate semi-structured data according to some embodiments.

FIG. 8 is a flow diagram illustrating operations of a method for utilizing an NLP service to evaluate semi-structured data according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the NLP service 110 of the other figures.

A request to utilize a trained NLP model for natural language processing is received at 802. The request may include, for example, one or more of: an identifier of the NLP model, a language of the file to process, an identifier of location of the file to process, the file itself, a flattened version of the file, an identifier of a flattened version of the file, how to provide a result, etc. Note the file includes semi-structured data.

In some embodiments, a file (HTML, spreadsheet, word processing, image document, image, etc.) to process is received at 804. Note the file could be stored in a storage location of the provider network or stored externally.

Text of the received file is extracted at 806. For example, text is found in images, extracted from fields, tables, lines, etc. In some embodiments, this is performed by a text extraction model 111. Note that if the request points to, or includes, an already flatted, canonical formatted file, this may not be necessary.

The received file is converted into a secondary format at 808 such as that discussed in FIG. 5. In some embodiments, this is performed by a document formatting model 112. Note that if the request points to, or includes, an already flatted, canonical formatted file, this may not be necessary.

At 810 one or more formatted files are built using the secondary format. For example, a JSON file, Pickle file, serialized HTML file, and/or a flatten UTF-8 text file are built. Note that if the request points to, or includes, an already flatted, canonical formatted file, this may not be necessary.

The (flattened) file is provided to the trained NLP ML model at 812 for processing.

The NLP ML model to evaluate the received file (as converted and/or flattened) at 814.

A result of the evaluation is provided according to the request at 816.

Figure 9:
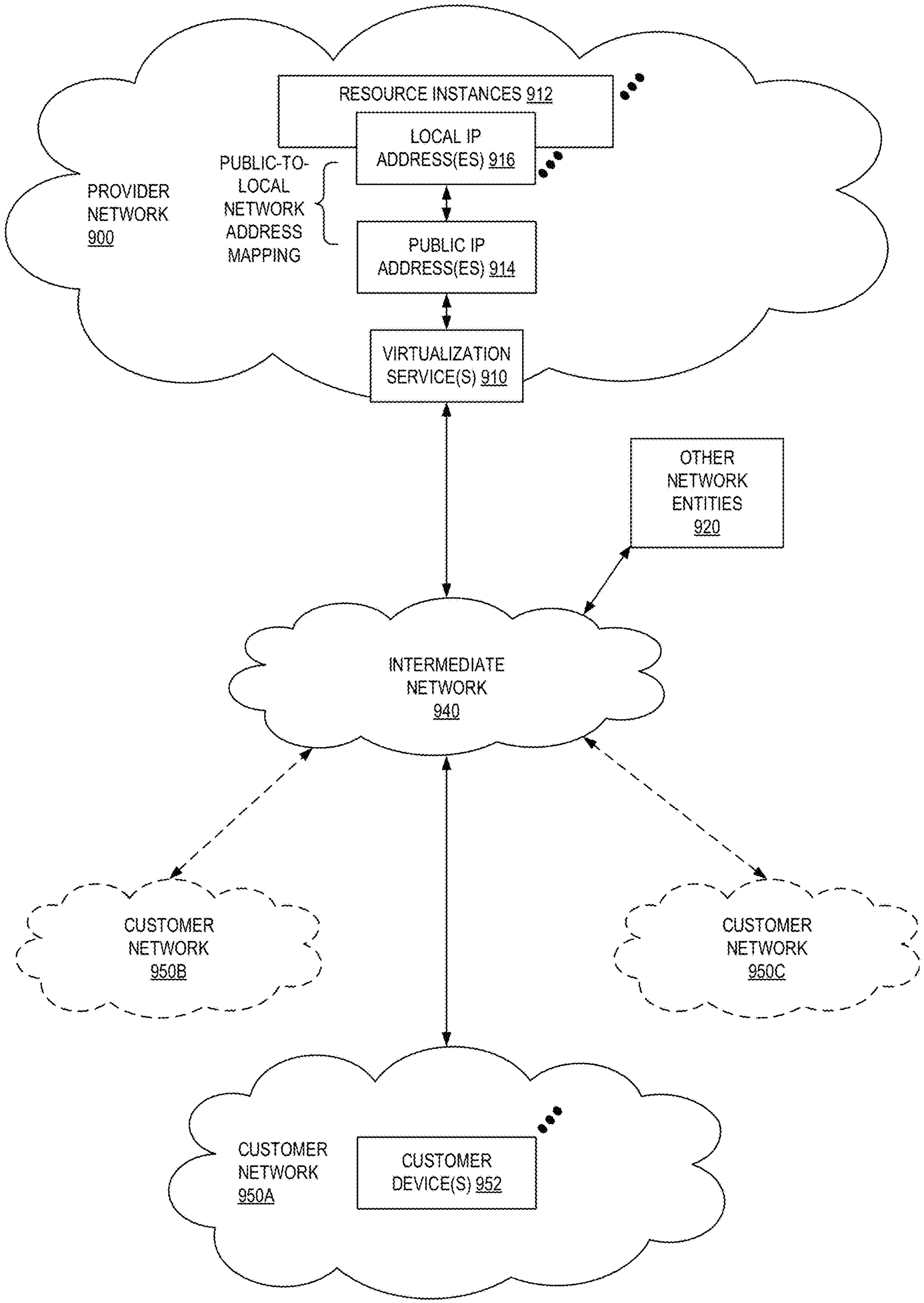
FIG. 9 illustrates an example provider network environment according to some embodiments.

FIG. 9 illustrates an embodiment of a request to utilize a trained NLP model.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
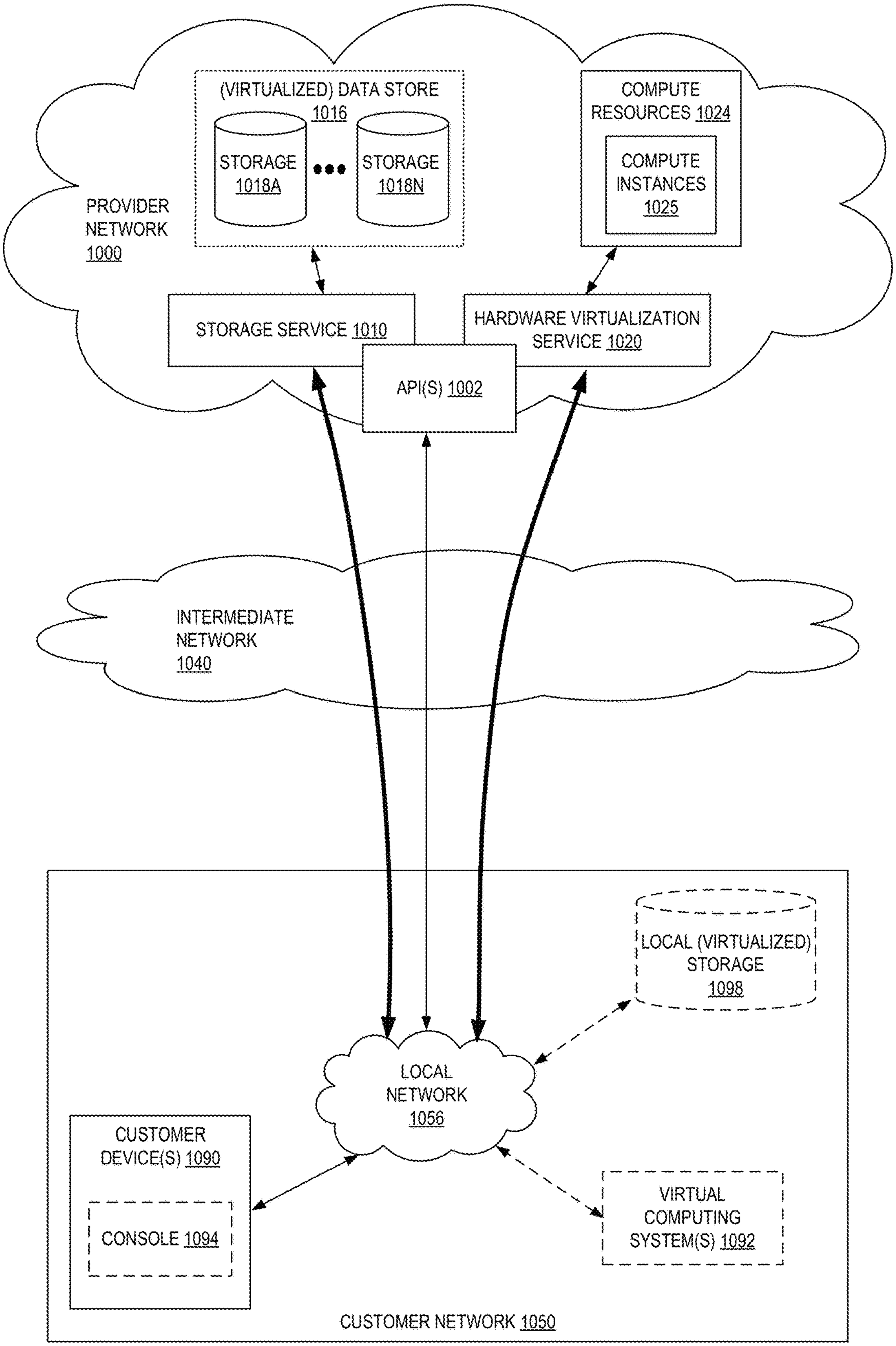
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple compute resources 1024 (e.g., compute instances 1025 such as VMs) to customers. The compute resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the compute resources 1024 to public Internet destinations, and from public Internet sources to the local IP addresses of compute resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
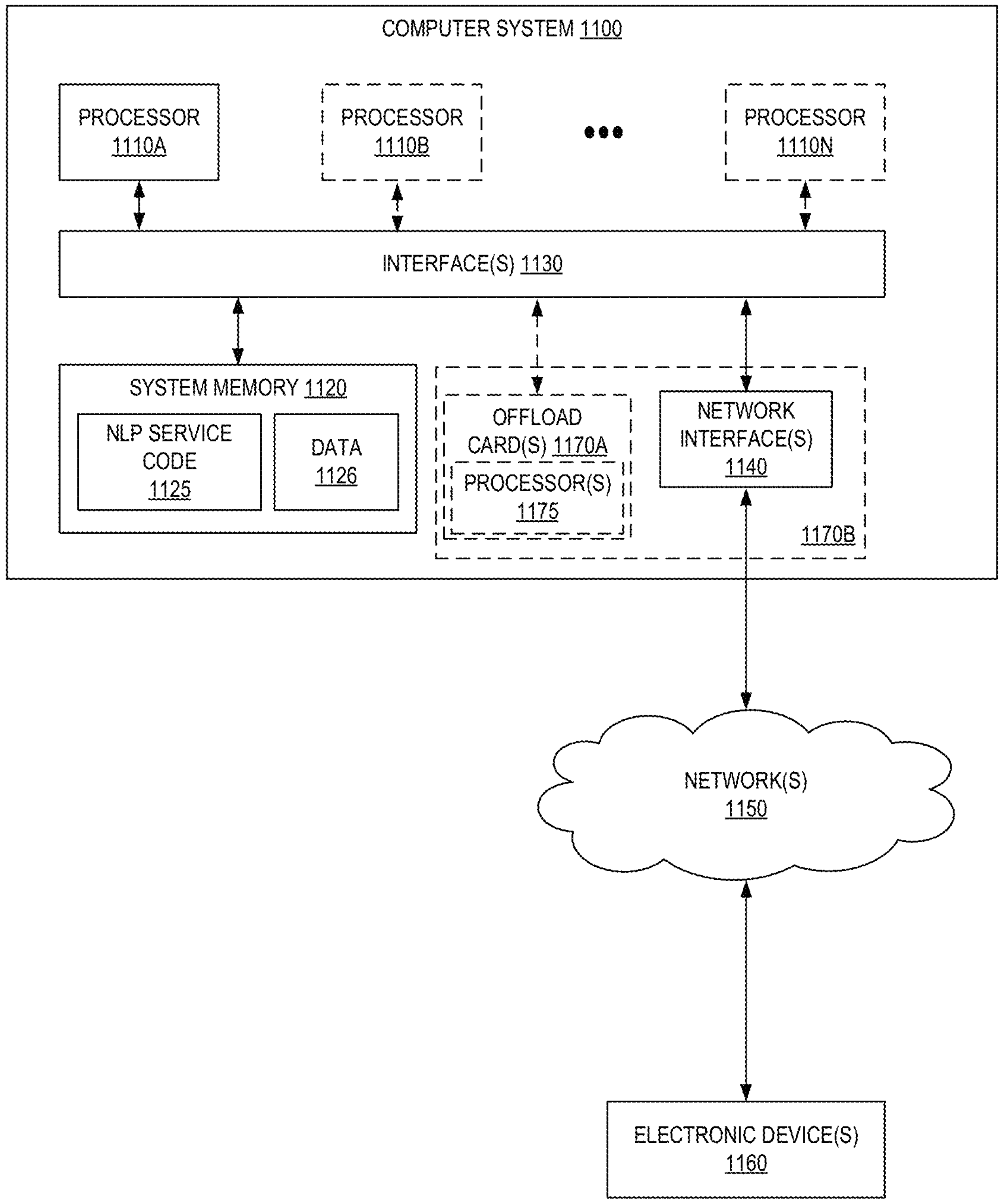
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as NLP service code 1125 (e.g., executable to implement, in whole or in part, the NLP service 110) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170A or 1170B (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some embodiments the offload card(s) 1170A or 1170B can perform compute instance management operations such as pausing and/or un-pausing compute instances, launching and/or terminating compute instances, performing memory transfer/copying operations, etc. These management operations may, in some embodiments, be performed by the offload card(s) 1170A or 1170B in coordination with a hypervisor (e.g., upon a request from a hypervisor) that is executed by the other processors 1110A-1110N of the computer system 1100. However, in some embodiments the virtualization manager implemented by the offload card(s) 1170A or 1170B can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving a semi-structured document to perform natural language processing (NLP) on using a trained NLP model;

converting the semi-structured document into a secondary format, wherein the secondary format includes spatial information for tokens of the semi-structured document;

flattening the converted, secondary formatted semi-structured document into a Unicode Transformation Format (UTF) text file, comprising serializing the converted secondary formatted semi-structured document by replacing nodes, of the secondary formatted semi-structured document, with symbols from a set of infrequently used UTF symbols;

performing NLP on the Unicode Transformation Format text file using the trained NLP model; and providing a result of the NLP to a requester.

2. The computer-implemented method of claim 1, wherein the semi-structured document is one of a word processing document, a mark-up language file, a spreadsheet file, and an image based file.

3. The computer-implemented method of claim 1, further comprising:

receiving a request to generate training data for the NLP model; and per document to be used to generate the training data for the NLP model, receiving a semi-structured document, converting the semi-structured document into a secondary format, flattening the converted, secondary formatted semi-structured document into a UTF text file, and building a serialized, mark-up language file from the converted, secondary formatted semi-structured document, wherein the mark-up language file is to be annotated by an oracle.

4. The computer-implemented method of claim 3, further comprising:

receiving an annotation for at least a proper subset of the files.

5. The computer-implemented method of claim 4, further comprising:

training the NLP model using the UTF text and annotated files.

6. The computer-implemented method of claim 1, wherein the secondary format is a canonical format.

7. The computer-implemented method of claim 1, wherein the semi-structured document is one of a word processing document, a mark-up language file, a spreadsheet file, and an image based filed.

8. The computer-implemented method of claim 1, wherein the NLP comprises at least one of detecting a dominant language, detecting entities, detecting key phrases, detecting personally identifiable information, detecting sentiment, detecting syntax, detecting events, or topic modeling.

9. The computer-implemented method of claim 1, wherein the secondary format is an image representation that includes text and image layers.

10. The computer-implemented method of claim 1, further comprising:

performing text extraction on the received semi-structured document prior to converting the semi-structured document into a canonical format.

11. A system comprising:

a first one or more electronic devices to implement a storage service in a multi-tenant provider network; and a second one or more electronic devices to implement a natural language processing (NLP) service in the multi-tenant provider network, the NLP service including instructions that upon execution cause the NLP service to:

receive a semi-structured document from the storage service to perform NLP on using a trained NLP model;

convert the semi-structured document into a secondary format, wherein the secondary format includes spatial information for tokens of the semi- structured document;

flatten the converted, secondary formatted semi-structured document into a Unicode Transformation Format (UTF) text file, comprising serializing the converted secondary formatted semi-structured document by replacing nodes, of the secondary formatted semi-structured document, with symbols from a set of infrequently used UTF symbols;

perform NLP on the UTF text file using the trained NLP model; and provide a result of the NLP to a requester.

12. The system of claim 11, wherein the NLP service is to perform text extraction on the received semi-structured document prior to converting the semi-structured document into the secondary format.

13. The system of claim 11, wherein the secondary format is an image representation that includes text and image layers.

14. The system of claim 11, wherein the semi-structured document is one of a word processing document, a mark-up language file, a spreadsheet file, and an image based filed.

15. The system of claim 11, wherein the NLP comprises at least one of detecting a dominant language, detecting entities, detecting key phrases, detecting personally identifiable information, detecting sentiment, detecting syntax, detecting events, or topic modeling.

16. The system of claim 11, wherein the secondary format is a canonical format.

17. A computer-implemented method comprising:

receiving a semi-structured document to perform natural language processing (NLP) on using a trained NLP model;

converting the semi-structured document into a secondary format, wherein the secondary format includes spatial information for tokens of the semi-structured document;

flattening the converted, secondary formatted semi-structured document into a Unicode Transformation Format (UTF) text file;

performing NLP on the UTF text file using the trained NLP model;

providing a result of the NLP to a requester;

receiving a request to generate training data for the NLP model; and per document to be used to generate the training data for the NLP model, receiving a semi-structured document, converting the semi-structured document into a secondary format, flattening the converted, secondary formatted semi-structured document into a UTF text file, and building a serialized, mark-up language file from the converted, secondary formatted semi-structured document, wherein the mark-up language file is to be annotated by an oracle.

18. The computer-implemented method of claim 17, further comprising:

receiving an annotation for at least a proper subset of the mark-up language files.

19. The computer-implemented method of claim 18, further comprising:

training the NLP model using the UTF text file and annotated files.

20. A computer-implemented method comprising:

receiving a semi-structured document to perform natural language processing (NLP) on using a trained NLP model;

converting the semi-structured document into a secondary format, wherein the secondary format includes spatial information for tokens of the semi-structured document;

performing text extraction on the received semi-structured document prior to the converting of the semi-structured document into the secondary format;

flattening the converted, secondary formatted semi-structured document into a Unicode Transformation Format (UTF) text file;

performing NLP on the UTF text file using the trained NLP model; and providing a result of the NLP to a requester.

* * * * *